United States Patent [19]
Orlando

[11] Patent Number: 5,203,114
[45] Date of Patent: Apr. 20, 1993

[54] SUPPORT DEVICE FOR A HINGED PANEL

[75] Inventor: James A. Orlando, Novi, Mich.

[73] Assignee: Ford Motor Company, Dearborn, Mich.

[21] Appl. No.: 772,743

[22] Filed: Oct. 7, 1991

[51] Int. Cl.⁵ .............................................. E05F 1/10
[52] U.S. Cl. .................................... 49/386; 16/82; 16/DIG. 16
[58] Field of Search .................... 49/386, 246; 16/364, 16/82, DIG. 16

[56] References Cited

U.S. PATENT DOCUMENTS

| | | |
|---|---|---|
| 3,081,078 | 3/1963 | Lohr . |
| 3,157,429 | 11/1964 | Harms et al. . |
| 3,709,522 | 1/1973 | Olson . |
| 3,876,040 | 4/1975 | Yang . |
| 4,194,598 | 3/1980 | Suozzo . |
| 4,358,151 | 11/1982 | Wood ................................. 16/364 |
| 4,493,469 | 1/1985 | Holobaugh . |
| 4,860,987 | 8/1989 | Werner . |
| 4,934,203 | 6/1990 | Bailey et al. . |

Primary Examiner—Philip C. Kannan
Attorney, Agent, or Firm—Roger L. May; Daniel M. Stock

[57] ABSTRACT

A support device (10) for a hinged panel (12) mounted on a vehicle (14), the panel (12) being angularly displaceable between an opened position (16) and a closed position (20). The support device (10) comprises an elongate connecting member (22) pivotally connected to the panel (12) and an associated rotatable helical mating surface (24). A support arm (26) is pivotally connected to the vehicle (14). The support arm (26), including its own helical mating surface (28) is adapted to telescopingly receive the helical mating surface (24) of the elongate connecting member (22). A multi-coil torsional spring (30) may exert a torque between the respective helical mating surfaces (24, 28) when they are in contiguous relationship. As an operator swings the panel (12) open, the support device (10) extends, and the torsional spring (30) stores potential energy. As the operator lifts the panel (12) to separate the helical mating surfaces (24, 28) momentarily, the torsional spring (30) produces a rotational displacement thereof, thereby re-uniting them. The frictional force generated between the helical mating surfaces (24, 28) resists the weight of the hinged panel (12). The hinged panel (12) may be secured in the opened position (16) or descend toward the closed position (20) at a rate which is controlled by the support device (10).

19 Claims, 3 Drawing Sheets

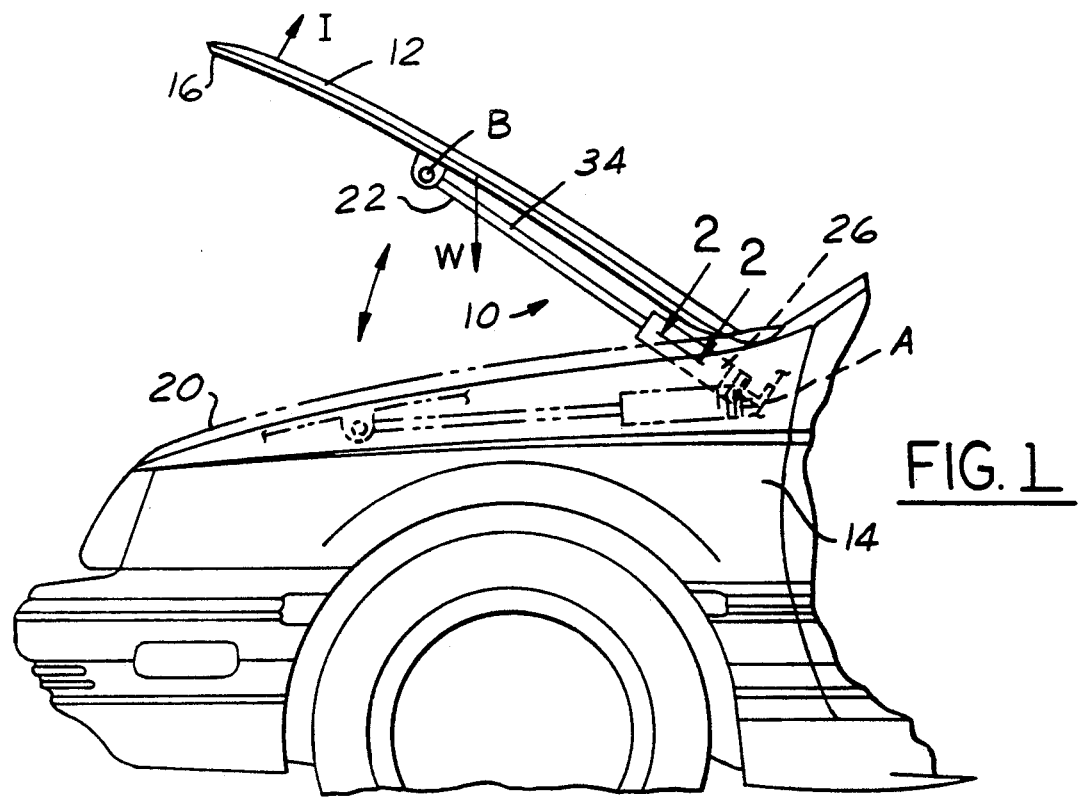
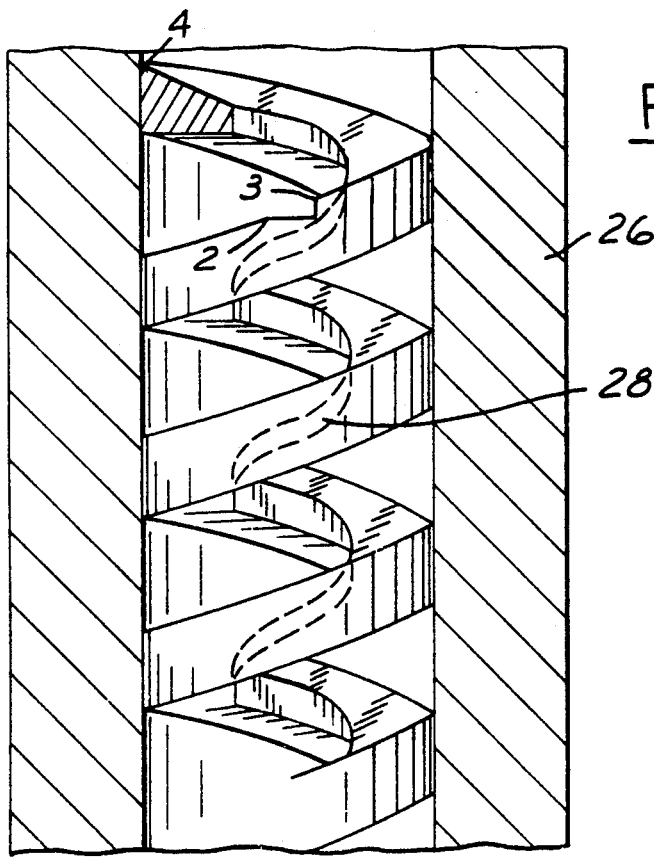
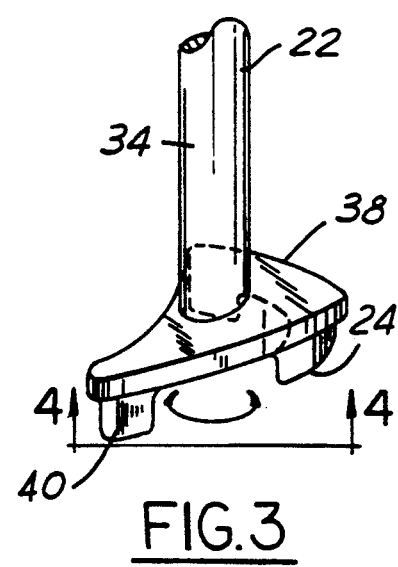

SUPPORT DEVICE FOR A HINGED PANEL

BACKGROUND OF THE INVENTION

1. Field of Invention

The present invention relates generally to support devices for hinged panels which are mounted on a vehicle, such as the hood thereof. More particularly, this invention concerns support devices which allow an operator to secure a panel in an opened position, and initiate a downward movement thereof so that the panel swings smoothly towards a closed position with a rate of descent which is controlled by the support device.

2. Related Art Statement

Hinged closure panels on automobiles take various forms, such as a hood, a deck lid, a glove box, an ash tray cover, and a sun roof. Some of such closure panels are at rest in a generally horizontal position and are movable therefrom toward a vertical position. Especially in the case of heavier panels such as the vehicle hood, it is desirable to support the panel securely in a fully opened position, to control the rate of descent of the panel, and to lock it in a closed position. Additionally, there may be a need to assure that such a panel is firmly held in the opened position so as to increase its resistance to wind on a gusty day, regardless of vehicle attitude.

One approach to such design needs is to provide a gas cylinder which is positioned under the closure panel. These approaches are somewhat effective in controlling the rate of descent of the panel. Nevertheless, in some devices there remains a need to support the panel reliably at the opened position, because such devices may diminish in effectiveness as gas escapes over time. Additionally, their performance characteristics may be influenced by environmental parameters, such as ambient heat and pressure.

Since gas pressure is affected by temperature, conventional gas cylinder lift assists may need to be installed in automobiles after paint operations to reduce their exposure to heat. It would therefore be desirable to have a support device for a hinged panel which could be installed with other body panels in the metal body shop without suffering deterioration during exposure to heat generated during subsequent painting operations.

The use of spiral or helical members to translate rotary into axial displacement is illustrated in such references as U.S. Pat. No. 2,408,181 issued to Simonton; U.S. Pat. No. 2,432,096 issued to Hammond; U.S. Pat. No. 3,709,522 issued to Olson; U.S. Pat. No. 4,493,469 issued to Holobaugh. However, none of these references disclose a support device for a hinged panel mounted on a vehicle where the panel is angularly displaceable between an opened position through intermediate positions to a closed position. Nor does any other known art teach the use of helical mating surfaces on a support device for a hinged panel which enable an operator to cause the panel to be secured in an opened position, or move it downwardly through intermediate positions at a controlled rate of descent.

SUMMARY OF THE INVENTION

In accordance with the invention, there is disclosed a support device for a hinged panel which is mounted on a vehicle. The panel is angularly displaceable between an opened position through intermediate positions, to a closed position.

The support device includes an elongate connecting member which is pivotally connected to the vehicle. Included in the elongate connecting member is a shaft portion and a helical mating portion disposed thereupon. In the preferred embodiment, the helical mating portion is freely rotatable in relation to the shaft.

To receive the elongate connecting member, there is provided a tubular support arm which also is pivotally connected to the vehicle in such a way that the elongate connecting member and the support arm extend between the panel and the vehicle. The support arm is provided on its inside with a helical mating surface which is adapted to cooperate with the rotatable helical mating surface of the elongate connecting member.

In one embodiment of the invention, housed within the elongate connecting member is a multi-coil spring with an anchoring end secured to the shaft portion of the elongate connecting member. At the opposite end of the torsional spring is an effective end which is engageable with the rotatable helical mating surface of the elongate connecting member.

Activation of the support device may be initiated by the operator as he swings the hinged panel toward its opened position. During this motion, the support device becomes extended. Concurrently, the rotatable helical mating portion of the elongate connecting member freely rotates within the helical mating surface of the hollow support arm. As a result, the multi-coil spring becomes tensioned.

Upon activation of the support device, the spring may exert a torque between the helical mating surfaces of the elongate connecting member and the support arm. A prerequisite for suspension is the placement of the hinged panel in its fully opened position. From this position, panel suspension or closure may occur without further operator input. To enact a collapse mode of the support device, the operator first lifts the hinged panel. The helical mating surfaces then separate, and compressive forces within the support device are eliminated. The torsional spring is thus able to release its stored energy and influence the radial positioning of the helical mating surfaces so that they re-unite in frictional engagement, thereby supporting the hinged panel.

The objects, features, and advantages of the present invention are readily apparent from the following detailed description of the best mode for carrying out the invention when taken in connection with the accompanying drawings.

BRIEF DESCRIPTION OF THE DRAWINGS

FIG. 1 is a side elevational view of a support device of the present invention, showing a hinged closure panel in its opened position, with the panel also depicted in phantom in its closed position;

FIG. 2 is a longitudinal sectional view of a tubular support arm of the support device taken along the line 2—2 of FIG. 1;

FIG. 3 is a perspective view of an elongate connecting member of the support device, showing a helical mating surface thereof, with circumferentially spaced lugs extending therefrom;

BEST MODES FOR CARRYING OUT THE INVENTION

Figure 4:
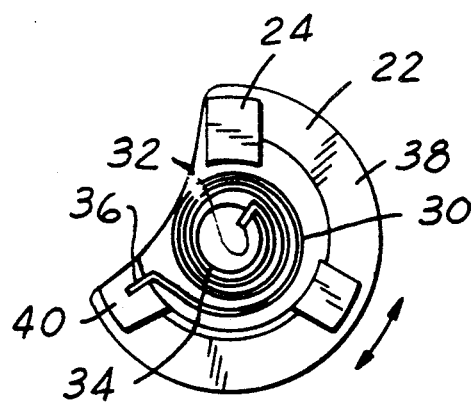
FIG. 4 is an end view of the elongate connecting member depicted in FIG. 3 taken along the line 4—4 thereof.
Figure 5:
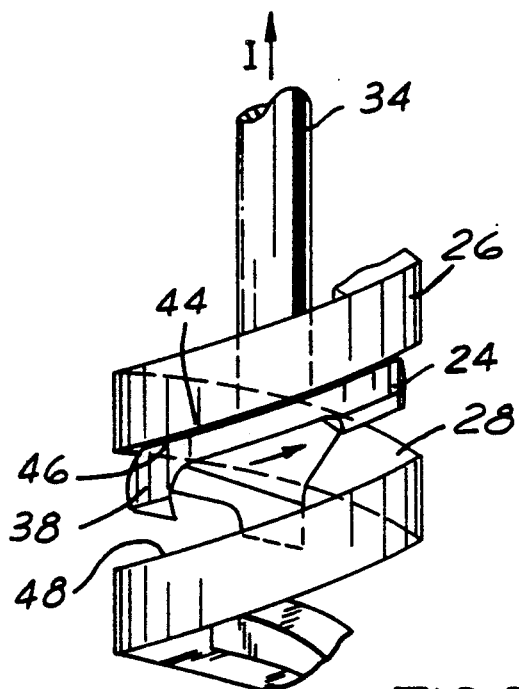
FIG. 5 is a side elevational view of the support device, illustrating the relative positioning of the respective helical mating surfaces of the elongate connecting member and the support arm when the hinged panel is being angularly displaced toward an opened position by an operator thrust (I)

Turning first to FIG. 1, there is depicted a support device generally depicted by the reference numeral 10 for a hinged panel 12 which is mounted on a vehicle 14. The panel 12 is angularly displaceable between an opened position 16 through intermediate positions, to a closed position which is shown in phantom by the reference numeral 20.

Referring now to FIGS. 1 and 3, the support device 10 comprises an elongate connecting member 22 which is pivotally connected to the vehicle 14 so that the elongate connecting member may swing, but not rotate axially. In the embodiment depicted, the elongate connecting member 22 is connected to the vehicle at a hinge pivot point represented by the letter "B". Included in the elongate connecting member 22 is a shaft portion 34 and a helical mating surface 24 disposed thereupon. In the preferred embodiment, the helical mating surface 24 is freely rotatable in relation to the non-rotating, but pivotable shaft portion 34. In alternate embodiments, the helical mating surface 24 is fixed in relation to the shaft portion 34. However, in such embodiments, the shaft portion 34 is rotatable about the longitudinal axis of the elongate connecting member 22 through a suitable connection at the pivot point "B".

The elongate connecting member 22 further comprises a foot portion 38 disposed on the shaft portion 34 at the opposite end of the elongate connecting member 22 from the hinged panel 12. The associated helical mating surface 24 includes one or more circumferentially spaced lugs 40 extending from the foot portion 38 which are frictionally engageable with a helical mating surface 28 of a support arm 26 in a manner to be described below. In one embodiment of the support device 10, there are three circumferentially spaced lugs 40. Preferably, the circumferentially spaced lugs 40 are equidistantly located around the periphery of the foot portion 38 to provide adequate and uniform load distribution.

Turning now to FIGS. 1 and 2, the support arm 26 also is connected to the vehicle 14 so that the elongate connecting member 22 and the support arm 26 extend between the hinged panel 12 and the vehicle 14 (hinge pivot point "A"). For illustrative purposes, FIG. 1 depicts a configuration in which the elongate connecting member 22 of the support device 10 is pivotally connected to the hinged panel 12 (point "B"). Alternatively, the support arm 26 could be connected to the hinged panel 12 at point "B". In that case, the elongate connecting member 22 would be connected to the vehicle at point "A".

In each embodiment, the support device 10 extends between the vehicle body (point A) and the hood (point B) so that as the panel 12 swings arcuately between the opened 16 and closed 20 positions, the support device 10 extends or contracts between points A and B.

Continuing with reference to the preferred embodiment depicted in FIGS. 1-3, it is the support arm 26 which is pivotally connected to the vehicle at point "A". As illustrated, the support arm 26 is adapted to receive the elongate connecting member 22. As best shown in FIG. 2, the tubular (female) support arm 26 is provided with an extended helical mating surface 28 disposed on the inside thereof, which is adapted to cooperate with the helical mating surface 24 of the (male) elongate connecting member 22.

As shown in FIG. 4, a multi-coil torsional spring 30 is housed within the elongate connecting member 22. The spring 30 has an anchoring end 32 which is securable to the shaft portion 34 of the elongate connecting member 22. At the opposite end of the torsional spring 30 and connected via multiple coils, is an effective end 36 which is securable to the helical mating surface 24 of the elongate connecting member 22. It will be appreciated that for clarity in FIG. 4, only two turns of the multi-coil spring 30 are shown. In practice, many more turns are needed to accommodate rotational displacement of the elongate connecting member 22 as it travels upwardly between consecutive pitches of the helical mating surface 28 of the support arm 26. If potential energy is stored in the torsional spring 30, it may exert a torque upon the helical mating surface 24 in relation to the shaft portion 34, and hence between the helical mating surfaces 24, 28 when they are in contiguous relationship.

It will be appreciated that in alternate embodiments, the torquing or twisting means, spring 30, may be housed approximate the pivot point "B". In that case, the anchoring and effective ends 32, 36 are still configured so as to be capable of exerting a torque between the respective helical mating surfaces 24, 28.

Activation of the support device 10 may be initiated by the operator as he swings the hinged panel 12 toward its opened position 16. During this movement, the support device 10 becomes extended and activated.

To collapse the support device 10, the operator momentarily lifts the hinged panel 12. The helical mating surfaces 24, 28 separate and compressive forces within the support device 10 are eliminated. Free of constraint, the coiled torsional spring 30 is able to release its stored energy and influence the radial positioning of the helical mating surfaces 24, 28 so that they re-unite in frictional engagement, thereby supporting the hinged panel 12.

As shown in FIG. 4, the torsional spring 30 is coiled during extension of the support device 10 as a result of interaction between a bottom side 44 of the helical mating surface 28 of the support arm 26 and a top side 46 of the helical mating surface 24 of the elongate connecting member 22. When the panel 12 rises, the shaft portion 34 also rises. As a result, the top and bottom sides 46, 44 of the respective helical mating surfaces 28, 24 interact and the foot portion 38 tends to move in a clockwise direction when viewed from below. Accordingly, the spring 30 becomes coiled and stores potential energy during such extension.

Preferably, the bottom side 44 and top side 46 of the respective helical mating surfaces 28, 24 are comprised of a material or coating having a low coefficient of friction, such as tetrafluoroethylene fluorocarbon polymers, or fluorinated ethylene-propylene resins having a non-stick finish. Such products may be sold under the trademark "Teflon ®", a trademark owned by DuPont de Nemours, E.I. & Company.

Figure 7:
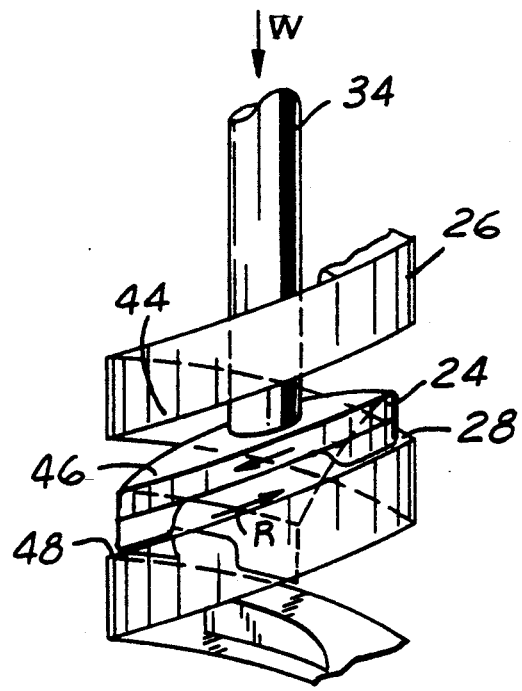
FIG. 7 is a side elevational view of the support device, illustrating the relative positioning of the respective helical mating surfaces of the elongate connecting member and the support arm when the hinged panel is at rest, or being angularly displaced under its weight (W) toward a closed position in a device-controlled manner.

Turning now to FIG. 7, during lowering of the panel 12, when the two helical mating surfaces 24, 48 are in contact, tangential friction forces (R) develop if one helical surface attempts to move with respect to the other. The resultant of operative forces when the respective helical mating surfaces 24, 28 interact depends upon at least three factors: (1) the weight (W) of the hinged panel; (2) the angle of inclination of the helical mating surface toward which the weight (W) is directed; and (3) the surface friction generated between the helical mating surfaces 24, 28. Static or dynamic equilibrium may result depending on the balancing of these factors. If the coefficient of friction is constant, the angle of inclination can be designed so that motion of a relatively constant velocity will occur, other factors being equal. It may travel downwardly through intermediate positions 18 at a device-controlled descent rate if the axial components of the weight (W) of the panel 12 and any operator thrust (I) exceed the frictional force (R). Accordingly, the descent rate of the hinged panel 12 will be predictable and controllable. Dependent on the inclination of the helical surface 26, its coefficient of friction, the weight (W) of the suspended mass, and any operator thrust (I), the system may be designed to allow the panel 12 to be supported at rest in the opened position 16.

Figure 8:
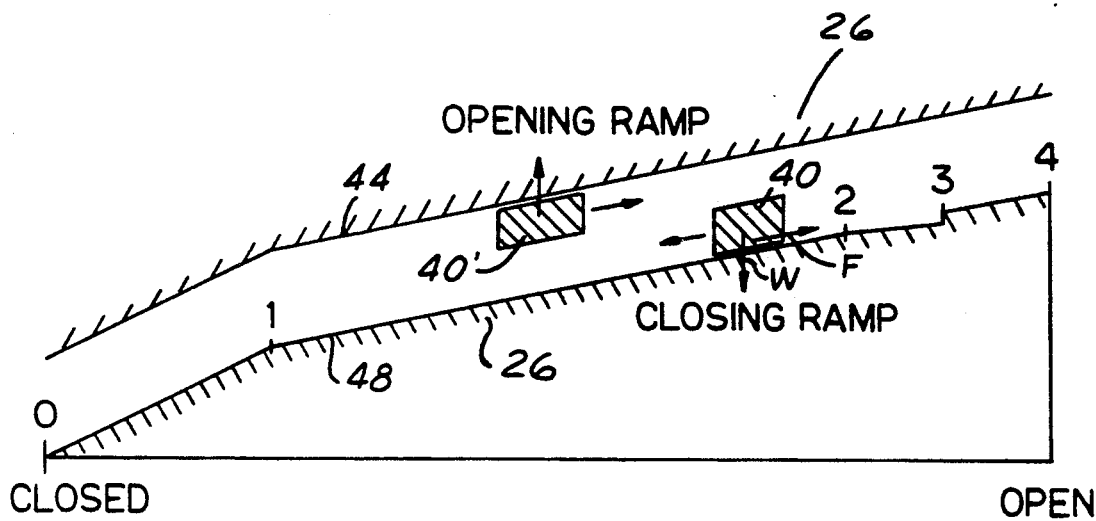
FIG. 8 is a schematic side elevational view of unwrapped segments of the spiral ramps formed by consecutive pitches of the helical mating surface of the support arm, illustrating travel of the spaced lugs thereover during displacement of the hinged panel between its opened and closed positions.

FIG. 8 depicts segments of the bottom side 44 and the facing top side 48 of adjacent pitch portions of the helical mating surface 28 of the tubular support arm 26. The gap formed between the bottom side 44 and top side 48 of adjacent pitches of the helical mating surface 28 defines a space along which the foot portion 38 and its associated lugs 40 travel during the opening and closing actions of the hinged panel 12.

The point (0) illustrates the closed position 20 of the hinged panel 12. When the hinged panel 12 is rotated therefrom, the foot portion 38 of the elongate connecting member 22 rotates while the support device 10 extends toward its fully opened position (point 4). As the operator exerts a thrust (I) sufficient to overcome the force of gravity upon the panel 12, it may be raised to a desired height. During opening, the hinged panel 12 moves against the minimal frictional forces generated between the bottom side 44 and top side 46 of the respective helical mating surfaces 28, 24.

Near the opened position (point 4, FIG. 8), the spring 30 has sufficient potential energy to advance the lugs 40 down the helical mating surface 28 (e.g. from point 4 to point 3). When the support device 10 places the lugs 40 between points 4 and 3, the weighted mass (W) of the hinged panel 12 may be released by the operator onto the support device 10. The rotatable lugs 40 then establish contact with the helical mating surface 28 and frictional forces engendered thereby resist further movement toward the closed position (point 0, FIG. 8).

Returning now to the helical mating surface 28 depicted in FIG. 8, there is a section having a reduced pitch angle between points 3-2. In this region, the hinged panel 12 is securely suspended because the weight (W) of the panel 12 rests securely on the ledge or plateau between points 3-2. Any reasonable downward pressure alone would be insufficient to collapse the support device 10 and close the hinged panel 12. In this state, one or more of the lugs 40 is squarely supported on the plateau between points 3-2. Accordingly, the panel 12 remains at rest.

While suspended in the opened position (points 2-3, FIG. 8), the device 10 remains unaffected by reasonable changes in the attitude of the vehicle 14. This design feature provides a positive support characteristic, regardless of the attitude of the vehicle 14.

Figure 6:
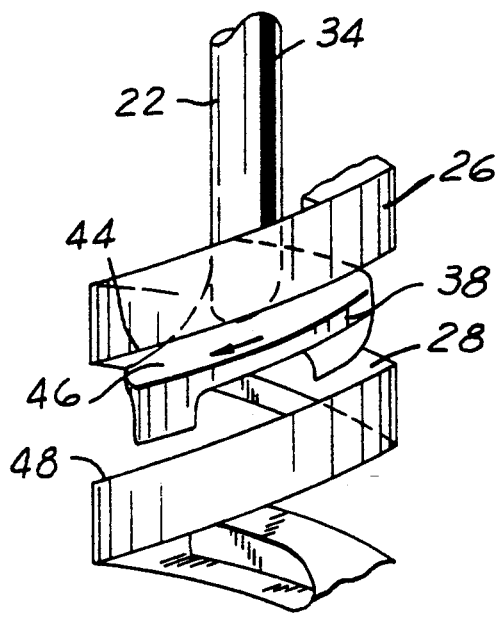
FIG. 6 is a side elevational view of the support device, illustrating the relative positioning of the respective helical mating surfaces of the elongate connecting member and the support arm when the hinged panel is momentarily elevated by the operator from a device-supported position.
Figure 9:
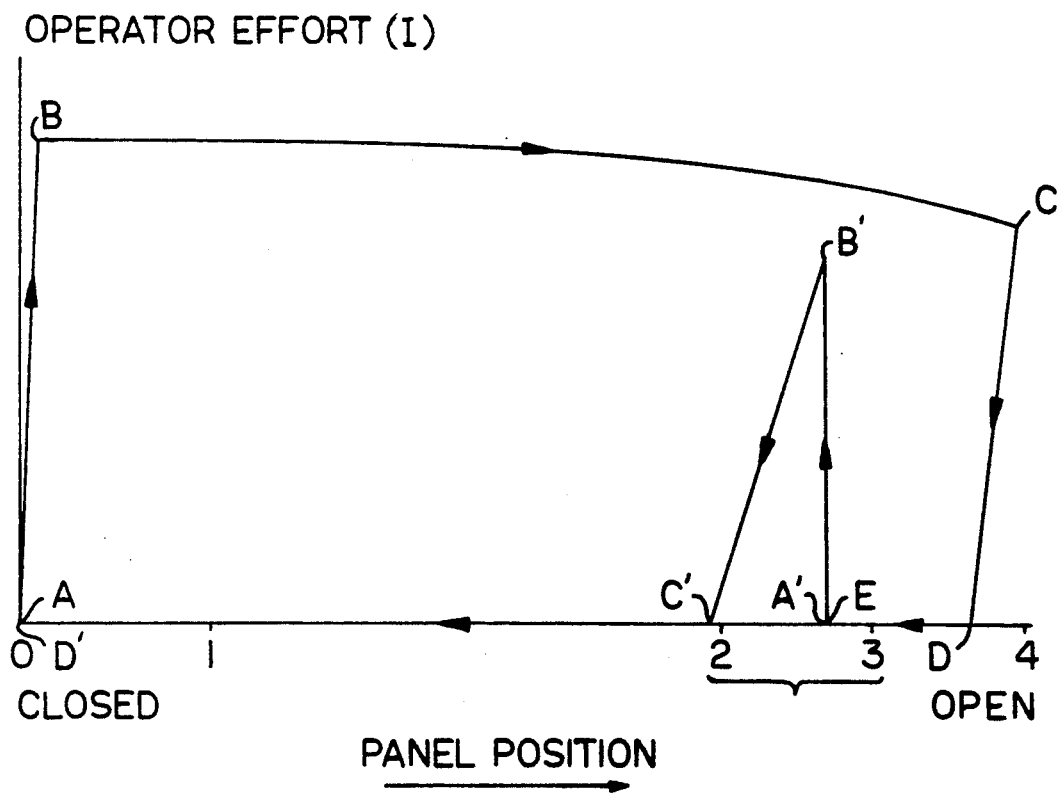
FIG. 9 is a graph illustrating how operator effort changes with panel position at various points of the opening-closing cycle, corresponding to the points depicted in FIG. 8.

To enable the hinged panel 12 to be closed, and the device 10 to be collapsed, the operator first applies an upward thrust (I) to lift the weight (W) of the panel 12 (A'-B', FIG. 9). As best shown in FIG. 6, the helical mating surface 24 of the elongate connecting member 22 then becomes separated from the helical mating surface 28 of the support arm 26. Compressive forces are eliminated and the device 10 is poised without gravitational bias. The rotary foot portion 38 is then influenced by the spring 30. As the operator begins to diminish his upward thrust (I), urged by the spring 30, the gap between the helical mating surfaces 24, 28 closes. Radial motion caused by the spring 30 enables the helical mating surfaces 24, 28 to re-unite.

The slope between points 2 and 1 (FIG. 8) is so configured as to be conducive to a slow, deliberate downward motion of the hinged panel 12, which the operator perceives as a controlled descent. During this stage of the closure operation, the support device 10 controls descent of the panel. During downward travel of the hinged panel 12, the foot portion 38 of the elongate connecting member 22 rotates. As a result of gathering downward momentum, the foot portion 38 passes beyond point 1.

In this region (points 1-0), the pitch of the helical mating surface 28 steepens, so that the panel descent rate accelerates, and its momentum increases. This allows the hinged panel 12 to reach an angular velocity or closure rate which allows automatic, secure latching.

FIGS. 8 and 9 have been arranged for clarity so that there is correspondence between the respective positions 0-4. FIG. 9 is helpful in understanding the amount of operator effort required at various points during movement of the hinged panel 12 between the opened and closed positions 16, 20.

To open the panel 12 from its closed position (point A) the amount of operator effort (I), as illustrated by the line A-B, rises from 0 up to a value equalling the force required to move the panel weight (W) from its closed position. The amount of required operator effort (I) diminishes between points B-C while the panel 12 swings toward its opened position. Between C-D, the operator effort (I) diminishes until point D is reached. This is because the support device 10 becomes extended, so that one of the lugs 40 are brought into contact between points 2-4 on the support arm 26. If one of the lugs 40 contacts the helical mating surface 28 of the support arm 26 between points 3-4, frictional forces are inadequate to support the hinged panel 12. Under gravitational influence, the panel 12 moves downwardly until one of the lugs 40 engages the plateau between 2-3. In this region, the hinged panel 12 is secured in the opened position 16.

As discussed earlier, to close the panel 12, the operator first exerts a momentary upward thrust (I), as illustrated by the line A'-B' in FIG. 9. As the respective helical mating surfaces 24, 28 become separated, the operator effort is diminished, as shown by the line B'-C'. During that time span, influenced by the spring 30, one of the lugs 40 re-unites with the topside 48 of the helical mating surface 28 of the support arm 26, such that re-engagement occurs below point 2. With no operator involvement, the hinged panel 12 then closes (line C'-D') under a device-controlled rate of descent because frictional forces are less than the weight (W) of the hinged panel 12 resolved parallel to the angle of inclination of the applicable segment of the helical mating surface 28.

While the invention has been described in conjunction with specific embodiments thereof, it is evident that many alternatives, modifications, and variations will be apparent to those skilled in the art in light of the foregoing description. For example, while there have been disclosed configurations wherein the spring 30 turns the helical mating surface 24 of the elongate connecting member 22, it will be appreciated that such turning effect could readily be achieved by configuring a spring so that the helical mating surface 28 of the support arm 26 may turn in relation to that of the elongate connecting member 22. In another alternate embodiment, springs may be loaded into the elongate connecting member 22 and the support arm 26, so that each may have a rotational bias, thereby enhancing the frictional forces developed between the respective helical mating surfaces 24, 28 when they are in contact.

I will also be understood that travel of the hinged panel 12 may be adjusted so that it moves arcuately through an increased radial distance. This is readily achieved by unscrewing or otherwise repositioning the elongate connecting member 22 relative to the support arm 26, thereby changing the effective length of the support device 10. Accordingly, this disclosure is intended to embrace all such alternatives, modifications, and variations as fall within the spirit and broad scope of the following claims.

I claim:

1. A support device for a hinged panel mounted on a vehicle, the hinged panel being angularly displaceable between an opened position and a closed position, the support device comprising:
   an elongate connecting member pivotally connected to the hinged panel, said elongate connecting member including a shaft portion and a helical mating surface disposed thereupon; and
   a support arm pivotally connecting to the vehicle, said support arm telescopingly receiving said elongate connecting member and being provided with a helical mating surface which is adapted to cooperate with said helical mating surface of said elongate connecting member,
   said helical mating surfaces being aligned about a common axis, one of said helical mating surfaces being rotatable relative to the other about said axis, whereby as the hinged panel is raised or lowered, either the elongate connecting member or the support arm may be stationary in relation to said axis.

2. The support device of claim 1, wherein said helical mating surface of said elongate connecting member is rotatable in relation to said shaft portion thereof.

3. The support device of claim 2, further comprising:
   means for twisting the helical mating surface of the elongate connecting member in relation to the helical mating surface of the support arm, said means for twisting extending between said shaft portion and said helical mating surface of said elongate connecting member, so that as an operator exerts a thrust on the hinged panel to separate said helical mating surfaces, said means for twisting may produce a rotational displacement thereof in relation to each other, thereby re-uniting said helical mating surfaces, whereupon a frictional force generated therebetween resists the weight of the hinged panel.

4. The support device of claim 3, said elongate connecting member further comprising:
   a foot portion disposed on said shaft portion at the opposite end of said elongate connecting member from the hinged panel;
   said associated helical mating surface including one or more circumferentially spaced lugs extending from said foot portion toward said helical mating surface of said support arm.

5. The support device of claim 4, wherein said means for twisting is energized during extension of the support device by rotary engagement of said foot portion in relation to said support arm, thereby enabling said torsional spring to store potential energy during such extension.

6. The support device of claim 4, wherein said one or more circumferentially spaced lugs comprise three lugs.

7. The support device of claim 6, wherein said lugs are equidistantly spaced around the periphery of said foot portion to provide uniform load distribution thereabout.

8. The support device of claim 1, wherein said support arm is tubular and includes an inner wall upon which said associated helical mating surface is disposed.

9. The support device of claim 1, wherein said helical mating surface of said support arm includes a plurality of consecutive pitch sections, one or more of which sections having a reduced pitch in relation to the other sections thereof.

10. The support device of claim 1, wherein said helical mating surface of said support arm includes a plurality of consecutive pitch segments, such that one or more pitch segments are disposed below one or more overlying pitch segments.

11. The support device of claim 10, wherein a lower pitch segment includes a topside, whereby as said helical mating surface of said elongate connecting member travels downwardly with respect to said helical mating surface of said support arm, said helical mating surface of said elongate connecting member engages said topside of a lower pitch segment.

12. The support device of claim 11, wherein said helical mating surface of said elongate connecting member includes a topside, so that as the support device extends and the hinged panel is moved toward the opened position, the topside of said helical mating surface of said elongate connecting member engages a bottom side of an overlying pitch segment of said helical mating surface of said support arm.

13. The support device of claim 12, wherein one or both of said topside of said helical mating surface of said one or more elongate connecting member and said bottom side of said one or more overlying pitch segments of said support arm comprise a low friction material.

14. The support device of claim 1, wherein said means for twisting comprises a multi-coil torsional spring.

15. A support device for a hood mounted on an automobile, the hood being angularly displaceable between an opened position and a closed position, the support device comprising:
   an elongate connecting member pivotally connected to the hood, said elongate connecting member including a helical mating surface disposed thereupon; and
   a support arm pivotally connected to the automobile, said support arm telescopingly receiving said elongate connecting member and being provided with a helical mating surface which is adapted to cooperate with said helical mating surface of said elongate connecting member,
   said helical mating surfaces being aligned about a common axis, one of said helical mating surfaces being rotatable relative to the other about said axis, whereby as the hood is raised or lowered, either the elongate connecting member or the support arm may be stationary in relation to said axis.

16. A support device for a hood mounted on an automobile, the hood being angularly displaceable between an opened position and a closed position, the support device comprising:
   an elongate connecting member pivotally connected to the hood, said elongate connecting member including a helical mating surface disposed thereupon;
   a support arm pivotally connected to the automobile, said support arm telescopingly receiving said elongate connecting member and being provided with a helical mating surface which is adapted to cooperate with said helical mating surface of said elongate connecting member,
   said helical mating surfaces being aligned about a common axis, one of said helical mating surfaces being rotatable relative to the other about said axis, whereby as the hood is raised or lowered, either or both of the elongate connecting member and the support may be stationary in relation to said axis; and
   means for twisting the helical mating surface of the elongate connecting member in relation to the helical mating surface of the support arm.

17. A support device for a hood pivotably mounted on an automobile, the support device comprising:
   an upper helical mating surface pivotally connected to the hood; and
   a lower helical mating surface pivotally connected to the automobile, said lower helical mating surface telescopingly receiving said upper helical mating surface, said helical mating surfaces being aligned about a common axis, one of said helical mating surfaces being rotatable relative to the other about said axis, whereby as the hood is raised or lowered, said relative rotation is constrained only by friction generated between said helical mating surfaces.

18. The support device of claim 17, further comprising:
   means for twisting the helical mating surfaces in relation to each other so that as an operator exerts a thrust on the hood to separate said helical mating surfaces, said means for twisting produces a rotational displacement thereof in relation to each other, thereby re-uniting said helical mating surfaces, whereupon a frictional force generated therebetween resists the weight of the hood.

19. A support device for a hinged panel mounted on a vehicle, the hinged panel being angularly displaceable between an opened position and a closed position, the support device comprising:
   an elongate connecting member pivotally connected to the vehicle, said elongate connecting member including a shaft portion and a helical mating surface disposed thereupon; and
   a support arm pivotally connected to the hinged panel, said support arm telescopingly receiving said elongate connecting member and being provided with a helical mating surface which is adapted to cooperate with said helical mating surface of said elongate connecting member,
   said helical mating surfaces being aligned about a common axis, one of said helical mating surfaces being rotatable relative to the other about said axis, whereby as the hinged panel is raised or lowered, either the elongate connecting member or the support arm may be stationary in relation to said axis.

* * * * *